US006451396B1

(12) United States Patent
Zumbrum et al.

(10) Patent No.: US 6,451,396 B1
(45) Date of Patent: *Sep. 17, 2002

(54) FLEXURE ENDURANT COMPOSITE ELASTOMER COMPOSITIONS

(75) Inventors: Michael Allen Zumbrum, Rising Sun, MD (US); Jason William Muller, Newark, DE (US)

(73) Assignee: Gore Enterprise Holdings, Inc., Newark, DE (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/204,429

(22) Filed: Dec. 3, 1998

Related U.S. Application Data

(60) Provisional application No. 60/074,703, filed on Feb. 13, 1998.

(51) Int. Cl.[7] .......................... B29D 22/00; B32B 27/00; B32B 09/04
(52) U.S. Cl. .................... 428/36.91; 428/421; 428/422; 428/447; 428/448
(58) Field of Search ............................. 428/422, 421, 428/36.91, 448, 35.7, 447

(56) References Cited

U.S. PATENT DOCUMENTS

| | | | |
|---|---|---|---|
| 2,927,908 A | 3/1960 | Konkle et al. ............... 260/41 |
| 3,159,601 A | 12/1964 | Ashby ....................... 260/46.5 |
| 3,220,970 A | 11/1965 | Carlstroem et al. ........... 260/37 |
| 3,284,406 A | 11/1966 | Nelson ...................... 260/46.5 |
| 3,436,366 A | 4/1969 | Modic ........................ 260/37 |
| 3,814,730 A | 6/1974 | Karstedt .................... 260/46.5 |
| 3,953,566 A | 4/1976 | Gore ........................ 264/288 |
| 3,962,153 A | 6/1976 | Gore ....................... 260/2.5 R |
| 4,096,227 A | 6/1978 | Gore ........................ 264/210 R |
| 4,130,535 A | * 12/1978 | Coran et al. ............... 260/33.6 |
| 4,133,927 A | 1/1979 | Tomoda et al. ............. 428/215 |
| 4,187,390 A | 2/1980 | Gore ..................... 174/102 R |
| 4,304,010 A | 12/1981 | Mano ............................ 3/1.4 |
| 4,764,560 A | 8/1988 | Mitchell .................... 524/506 |
| 4,816,339 A | 3/1989 | Tu et al. .................... 428/421 |
| 4,832,009 A | 5/1989 | Dillon ....................... 128/156 |
| 4,891,407 A | 1/1990 | Mitchell .................... 525/104 |
| 4,945,125 A | * 7/1990 | Dillon et al. ............... 527/427 |
| 5,071,609 A | * 12/1991 | Tu et al. .................... 264/119 |
| 5,288,829 A | 2/1994 | Takago et al. ............... 528/15 |
| 5,292,848 A | 3/1994 | Ikeno et al. ................. 528/15 |
| 5,314,981 A | 5/1994 | Takago et al. ............... 528/36 |
| 5,418,023 A | * 5/1995 | Hernandez et al. ......... 428/36.5 |
| 5,427,831 A | * 6/1995 | Stevens ..................... 428/36.2 |
| 5,554,779 A | 9/1996 | Sato et al. .................. 556/419 |
| 5,599,631 A | * 2/1997 | Chen et al. ................. 428/421 |
| 6,077,609 A | * 6/2000 | Blong et al. ................ 428/412 |

FOREIGN PATENT DOCUMENTS

| | | |
|---|---|---|
| EP | 0 256 748 | 2/1988 |
| WO | WO 87/02996 | 5/1987 |
| WO | WO 91/17205 | 11/1991 |

* cited by examiner

Primary Examiner—Rena L. Dye
Assistant Examiner—Michael C. Miggins
(74) Attorney, Agent, or Firm—Dianne Burkhard

(57) ABSTRACT

A flexure endurant composition of an elastomer reinforced with a continuous phase of microporous, expanded polytetrafluoroethylene (ePTFE) having a ratio of elastomer to PTFE of approximately 1:1 to 50:1 on a volume basis. The composite is prepared by a coating process and the final articles are prepared by molding or vulcanizing. Such materials can be used to fabricate pump tubing, pump diaphragms, gaskets, bellows and other mechanical devices.

18 Claims, 8 Drawing Sheets

FLEXURE ENDURANT COMPOSITE ELASTOMER COMPOSITIONS

RELATED APPLICATIONS

The present application is a regular application based on U.S. Provisional Patent Application No. 60/074,703 filed Feb. 13, 1998.

FIELD OF THE INVENTION

A flexure endurant composition of elastomer reinforced with a continuous phase of microporous, expanded polytetrafluoroethylene (ePTFE).

BACKGROUND OF THE INVENTION

Silicone elastomers can be fabricated into many forms for use, illustratively, in the medical, electrical, and chemical industries. Articles such as peristaltic pump tubes, pump diaphragms, bellows, baby bottle nipples, wire and cable sheaths, gaskets, and O-rings, for example, are commonly made from silicone elastomers. Many of these articles, moreover, are used in applications that require repeated flexing. For example, peristaltic pumps are used to transport liquids and pastes through an elastomeric tube in which the tube is squeezed between a set of rotating rollers and a fixed pump housing. Silicone elastomers are frequently used for peristaltic pump tubing. Upon repeated flexure, however, the silicone rubber tubing develops cracks in the side wall and ruptures catastrophically. The problem is exacerbated when pumping fluids at elevated pressures and temperatures, leading to even shorter pump tubing life. Clearly, a more durable substance is needed for these purposes.

Silicones are a class of inherently flexible polymers with organosilicon-oxygen repeating units which undergo bond rotation with little resistance. As a result, silicones possess excellent low temperature properties; however, their weak intermolecular and intramolecular polymer interactions result in poor tear strength and toughness. As a result, silicone elastomers are often reinforced with either particulate inorganic fillers or soluble silicone resin fillers. Inorganic fillers, such as fumed silica, for example, are known to increase the tensile strength of dimethyl silicones by a factor of ten. Even the best silicone elastomers, however, are still limited to approximately 1,300 psi tensile strength (ASTM D-412) and 250 ppi tear strength (ASTM D-624 die B). Natural rubber, on the other hand, has significantly higher tensile and tear properties; however, it lacks many of the useful silicone elastomer attributes of low temperature flexibility, low dielectric loss, ozone resistance, low extractables, and radiation resistance. Thus, the need for an improved class of reinforced silicone elastomers that combine the strength and toughness of natural rubber with the useful attributes of silicone rubber continues to be unsatisfied.

Polytetrafluoroethylene (PTFE) is a polymer with excellent chemical inertness coupled with high strength. In U.S. Pat. Nos. 3,953,566; 3,962,153; 4,096,227; and 4,187,390, Gore teaches the lubrication of PTFE powder and subsequent expansion of the PTFE into a microstructure characterized by nodes interconnected by fibrils. In these patents, Gore teaches the use of non-reactive fluids such as kerosene, naphtha, or mineral spirits as the lubricating fluid to aid in the extrusion of PTFE fine powder. The PTFE is extruded into a tape and dried to remove the non-reactive lubricant. Finally, the extrudate is expanded to produce a material that has both high porosity and high strength.

Expanded PTFE (ePTFE) has also been prepared using reactive lubricants, as seen in Mitchell (U.S. Pat. No. 4,764,560), and Tu (EP 256,748; U.S. Pat. No. 5,071,609). Reactive lubricants consist of uncured silicone and optionally a solvent such as kerosene, naphtha, or mineral spirits. The PTFE fine powder is lubricated, extruded, and expanded. During the expansion process, the silicone cures in situ to form an interpenetrating polymer network (IPN) of PTFE and silicone elastomer. Such expanded structures have residual porosity, high strength, and moderate resilience. Mitchell (U.S. Pat. No. 4,764,560; U.S. Pat. No. 4,891,407; WO 87/02996) and Dillon (U.S. Pat. No. 4,832,009; WO 9117205), for example, teach the use of heat curable dimethylsilicone to produce a porous microstructure of interpenetrating matrices in cured form with moisture vapor transmission properties for use as bandages for severe burn victims. The amount of curable silicone suggested in Mitchell's '560 and '407 patents can range from as little as 1 part by weight per 100 parts of PTFE to as much 150 parts of silicone per 100 parts of PTFE. Using Mitchell, however, it is not feasible to expand paste extruded tape having more than 20 weight percent silicone into a microstructure of interpenetrating matrices in cured form due to the lack of interconnection between nodes and fibrils which results in poor extrudate green strength. Thus, the compositions described by Mitchell possessed little elasticity due to their relatively high volume fraction of PTFE when compared to the present invention.

Tu (U.S. Pat. No. 4,816,339) also describes the use of reactive and unreactive lubricants for the preparation of radially asymmetric vascular grafts having an elastomer content ranging from 5 to 120 weight percent ratio of elastomer relative to PTFE. Tu teaches the use of fluoroelastomers, silicone elastomers, and others. A typical process used for producing a multi-layer PTFE/elastomer implant included blending the PTFE fine powder with the solvated elastomer, preforming a multilayered billet, extruding out of a die, curing the elastomer, expanding the composite, and forming an optional elastomeric polymer coating layer via a dip or spray coating operation. Other tubular prostheses have been developed by Mano (U.S. Pat. No. 4,304,010) which comprise a porous tubing of PTFE having a microstructure composed of fibrils and nodes connected to one another by the fibrils, the fibrils being radially distributed, and a porous coating of an elastomer bound to the outside surface of said PTFE tubing. The prosthesis can be vacuum impregnated with elastomer solution to provide a coating thickness of between 20 and 500 microns. The prosthesis has improved suture tear resistance when compared to previous art.

Tomoda (U.S. Pat. No. 4,133,927) teaches the lamination of ePTFE to an elastomer substrate wherein the porous sheet of ePTFE forms a layer having a thickness of about 0.05 mm or more on the surface of the elastomer substrate. The composite is formed by superimposing the porous film or sheet on a vulcanizable rubber elastomer substrate and subjecting the material to heat and pressure sufficient to affect vulcanization of the rubber and adhesion between the porous PTFE and the elastomer substrate. In the case of fluorine-containing rubber, the resulting composite exhibits excellent chemical resistance. Tomoda does not teach the use of multiple layers of ePTFE to form a composite that is capable of transferring stress on a molecular level throughout the bulk.

For many years, silicone elastomers have been modified with PTFE powder to increase their lubricity, thermal stability, and tear strength. Safford (U.S. Pat. No. 2,710,290)

teaches the use of a minor portion of solid PTFE dispersed throughout the silicone to form randomly distributed fibrils. He shows that the PTFE particles were elongated in situ within the silicone matrix by means of shear deformation action. As a result, the tear strength, as measured by ASTM D-624 (die B), was increased from 65 ppi to 230 ppi. Konkle teaches in U.S. Pat. No. 2,927,908 that PTFE can be used to increase tensile and tear strength in heat curable fluorinated organopolysiloxane elastomers. These composites were also characterized as fuel and oil resistant. These examples of PTFE particles dispersed into silicone rubber are limited to less than 25 weight percent due to the difficulty in processing of the rubber and deterioration of the physical properties of the vulcanizate. Unlike the present invention, PTFE powder filled elastomers lack the continuous layer of ePTFE whose microstructure can be characterized by nodes interconnected by fibrils, and thus have inferior flexure resistance.

SUMMARY OF THE INVENTION

It is an object of the present invention to provide a composite elastomer with superior flexure endurance wherein the ratio of elastomer to ePTFE ranges from 1:1 to 50:1 on a volume basis.

Another object of the present invention is to provide a chemical resistant fluoroelastomer for applications that require flexure in the presence of aggressive chemicals.

Still another object of the present invention is to provide a reinforced elastomer useful for pump components, diaphragms, gaskets, seals, o-rings, belts, tubes, and bellows.

The present invention relates to flex endurant elastomer compositions based on elastomers reinforced with a continuous phase of microporous or expanded polytetrafluoroethylene (ePTFE). More particularly, the invention relates to a mixture of ingredients comprising (1) a liquid elastomer convertible to a cured, solid elastic state and (2) a minor portion of ePTFE having a continuous microstructure characterized by nodes interconnected by fibrils.

There are also provided methods for fabricating these flex endurant composites of an elastomer and ePTFE. The processes involve coating ePTFE material with liquid elastomer, wrapping the impregnated material around a mandrel, and, optionally, applying heat and/or pressure to vulcanize the elastomer.

DESCRIPTION OF THE INVENTION

Figure 1:
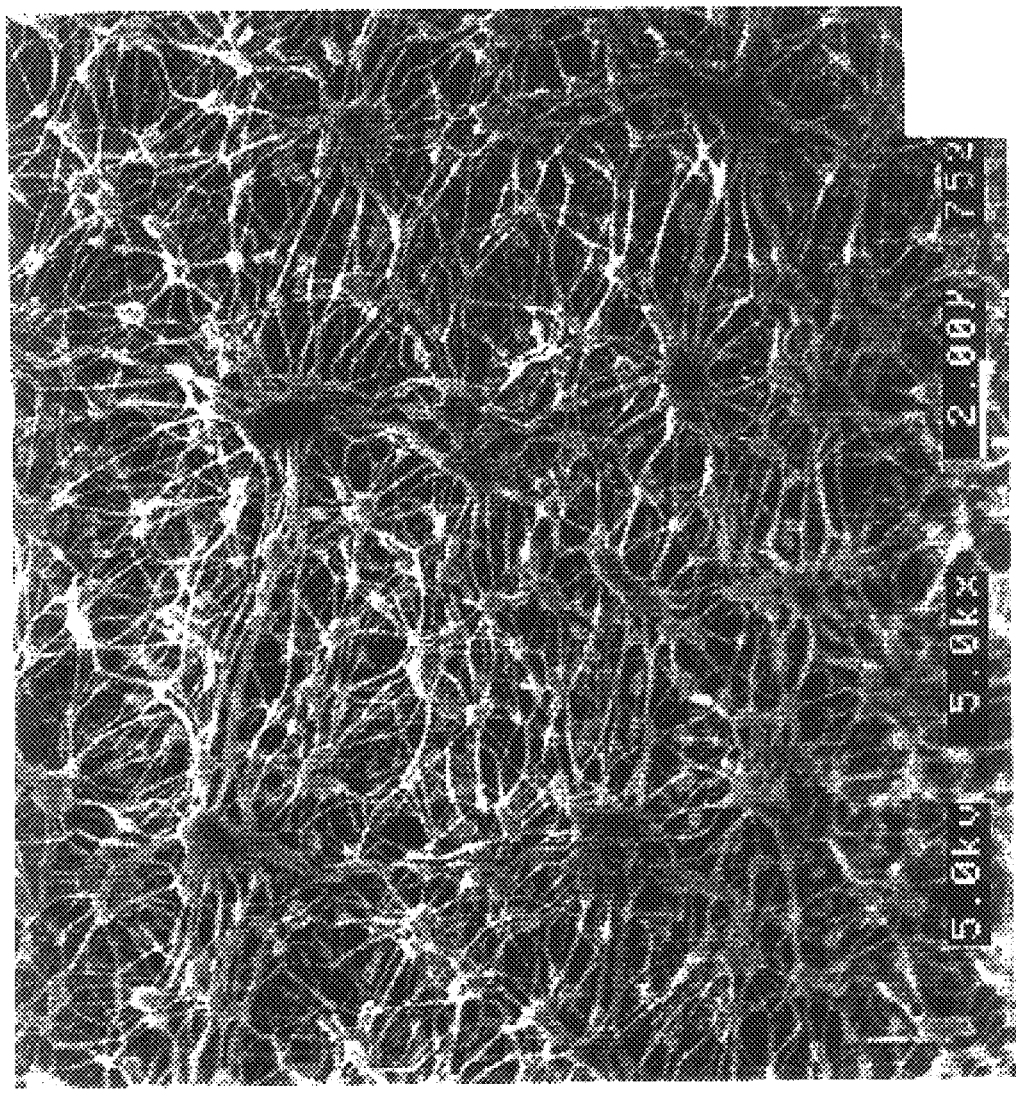
FIG. 1. Scanning electron micrograph (SEM) of ePTFE at 5,000 times magnification showing the continuous microstructure characterized by nodes interconnected by fibrils.

The compositions of the present invention provide superior flexure endurant elastomer composites. The use of expanded PTFE provides a microstructure of nodes interconnected by fibrils that serve to distribute stress from one part of the elastomer to another, on a molecular level. This composite is formed in the following manner:

First, an expanded PTFE (ePTFE) material is produced, such as through the methods described in U.S. Pat. No. 3,953,566 to Gore. For instance, the ePTFE membrane may be formed from a mixture of PTFE resin (having a crystallinity of about 95% or above) and a liquid lubricant (e.g. a solvent of naphtha, white oil, mineral spirits, or the like). The mixture is thoroughly blended and then formed into a pellet. The pellet is extruded into a tape using a ram-type extruder. Subsequently, the lubricant may then be removed through evaporation in an oven. The resulting tape may then be subjected to either uniaxial or biaxial stretching at a temperature of less than 327° C. to impart the desired amount of porosity and other properties to the membrane. Stretching may be performed through one or more steps. The resulting membrane may then be subjected to a sintering temperature above 345° C. (i.e. the melting temperature of PTFE) to amorphously lock the membrane in its expanded orientation. The result is a porous structure, as show by the scanning electron micrograph (SEM) in FIG. 1, which depicts the polymeric nodes, interconnected by fibrils. Typical properties of a structure comprise an average fibril length between nodes of 0.05 to 30 microns (preferably between 0.2 and 30 microns), and a void volume of 20 to 90%. As should be evident from the following description, the precise properties and dimensions of ePTFE structures employed with the present invention are a function of the application. Particulate fillers can also be incorporated into the ePTFE structure as taught by Gore (U.S. Pat. No. 4,096,227; U.S. Pat. No. 4,187,390). Fillers, such as fumed silica, provide an active site for either covalent linking of the elastomer to the ePTFE or for hydrogen bonding of the elastomer to the filler. The general membrane properties suitable for use with the present invention should include medium to high porosity, and wettability by various solvents, such as methylene chloride, toluene, and/or acetone.

Substrate material made through one of the above described methods and suitable for use in the present invention is commercially available in a wide variety of forms from a number of sources, including under the trademark GORE-TEX® from W.L. Gore & Associates, Inc., Newark, Del.

The elastomers used in the present invention may be natural or synthetic in origin. Examples of common synthetic elastomers include silicones, urethanes, nitrile rubber, styrene-butadiene-styrene (SBR), chloroprene, phosphazenes, fluoroelastomers, perfluoroelastomers, perfluoropolyether elastomers, having a rubbery elastic modulus of less than $10^7$ Pa. In a preferred embodiment of this invention, solventless liquid elastomers can be used that simplify processing and are more environmentally acceptable. Such liquid elastomers are commercially available in a wide variety of forms from a number of sources, including under the trademark SILASTIC® from Dow Corning Corporation, Midland, Mich. and as a series of room temperature vulcanizates (RTV) from General Electric Silicones, Waterford, N.Y. A series of liquid perfluoro polyether elastomers are available under the trademark SIFEL® from Shin Etsu Chemical, Tokyo, Japan.

The organosilicone elastomer component can be cured using various mechanisms; however, hydrosilylation reactions between vinyl and hydride functional polymers is the preferred approach and will be referred to as an addition cure system in this application. These elastomers are preferably formulated to be solventless, liquid materials in the uncured state at room temperature. Addition cure elastomers typically consist of linear polymer, reinforcing agent, crosslinker, catalyst, inhibitor, and, optionally, an adhesion promoter.

Linear silicone polymers used in this invention have viscosities up to 1,000,000 cps or more at 25° C. and are, preferably, functionalized with dimethylvinyl groups at the ends of the polymer chains and/or vinylmethyl siloxane repeat units in the polymer backbone. Solventless coating techniques can be employed if the polymer viscosity is maintained between 10 and 100,000 cps at 25° C. and, especially, when the viscosity is between 1,000 and 50,000 cps at 25° C.

Reinforcing and/or extending agents include insoluble particulate fillers such as fumed silica, precipitated silica, ground quartz and carbon black. These fillers are preferably treated with silane coupling agents to render them hydrophobic and thus more compatible with the silicone base polymer. Soluble reinforcing agents include polyorganosiloxane resins of the type disclosed by Modic (U.S. Pat. No. 3,436,366) and Nelson (U.S. Pat. No. 3,284,406). Silicone resins are hyperbranched copolymers of one or more of M (trimethyl siloxy), D (dimethyl siloxy), or T (methyl siloxy) units condensed with Q (silicate) units. Also, one or more of the M, D, or T units could be functionalized with vinyl, hydride, trifluoropropyl, phenyl, or other alkyl groups. Preferred compositions are MDQ resins with vinyl functionality on either the M or the D siloxane units. The use of these soluble resins often permits the formulation of solventless materials that are reinforced but are not thixotropic as in the fumed silica reinforced materials. Polyorganosiloxane resin materials admixed with linear polymers are preferably formulated to have viscosities below 100,000 cps for solventless application. High viscosity materials can be employed with the use of solvents.

Crosslinkers such as organohydrogen polysiloxanes can be used in the instant invention in either linear or resinous form. Linear crosslinkers are preferably functionalized with dimethylhydrogen groups at the ends of the polymer chains and/or methylhydrogen siloxane repeat units in the polymer backbone. The polyorganosiloxane resin crosslinkers are hyperbranched copolymers of one or more of M, D, or T units condensed with Q units. One or more of the M, D, or T units could be functionalized with vinyl, hydride, trifluoropropyl, phenyl, or other alkyl group. Both the linear and resinous crosslinkers have viscosities between 25 and 10,000 cps at 25° C., with a preferred range between 50 and 1,000 cps at 25° C.

Inhibitors used to control the cure rate of addition cure RTVs at either room temperature or elevated temperatures include polymethylvinylcyclosiloxane having three to six methylvinylsiloxane units per molecule. Another class of preferred inhibitors are the acetylenic compounds (U.S. Pat. No. 3,445,420), particularly 2-methyl-3-butyn-2-ol.

Catalysts for the addition cure elastomers include precious metals such as platinum, rhodium, palladium, and others. These precious metals can be solubilized or complexed in solution as taught by Karstedt in U.S. Pat. No. 3,814,730, by Ashby in U.S. Pat. No. 3,159,601, and Lamoreaux in U.S. Pat. No. 3,220,970. A preferred catalyst for addition cure elastomers is platinum solubilized in vinyl functional silicone polymer at a level of between 0.5 and 50 wppm platinum in the final elastomer. Organic peroxides can be used to crosslink vinyl containing elastomers. Preferred peroxides include benzoyl peroxides, dicumyl peroxide, di-t-butyl peroxide, and others familiar to one skilled in the art.

Condensation cure elastomers can also be employed in the described invention. These elastomers are formed from the condensation of hydrolyzable silicone polymers such as hydroxyl functional dimethyl siloxane. Catalysts used to crosslink these elastomers include tin and titanium based compounds. Preferable condensation catalysts include dibutyl tin dilaurate and dibutyl tin oxide.

Polyorganosilicone materials can be formulated to be either one or multicomponent in nature. A preferred two component system includes an "A" and a "B" side. The "A" preferably includes the linear polymer, reinforcing agent, and catalyst. The "B" side preferably includes the linear polymer, reinforcing agent, inhibitor, crosslinker, and optionally a silane coupling agent. These systems are commercially available in various ratios of "A" to "B" including, but not limited to 10:1, 9:1, and 1:1. In some cases, a one part material can be formulated to include the linear polymer, reinforcing agent, crosslinker, inhibitor, catalyst, and, optionally, a silane coupling agent with the selection of an appropriate inhibitor.

The perfluoro polyether based SIFEL® elastomers involve the hydrosilylation between vinyl and hydride functional polymers with perfluoro polyether repeating units for the backbone as taught in U.S. Pat. Nos. 5,288,829; 5,554,779; 5,314,981; and 5,292,848. These elastomers are preferably formulated to be solventless, liquid materials in the uncured state at room temperature. These perfluoro polyether based RTVs consist of linear polymer, crosslinker, catalyst, inhibitor, and, optionally, reinforcing materials and adhesion promoter(s).

Figure 2A:
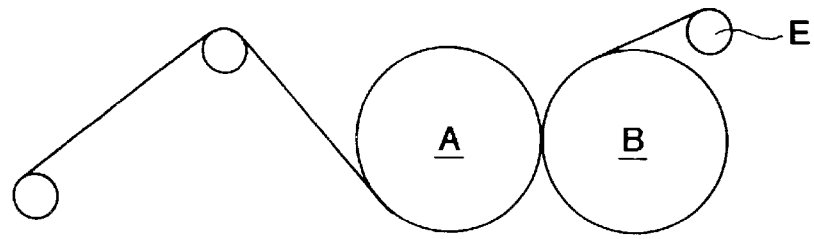
FIGS. 2A, 2B and 2C are schematic representations of gravure coating processes for impregnating ePTFE with liquid elastomer.
Figure 2B:
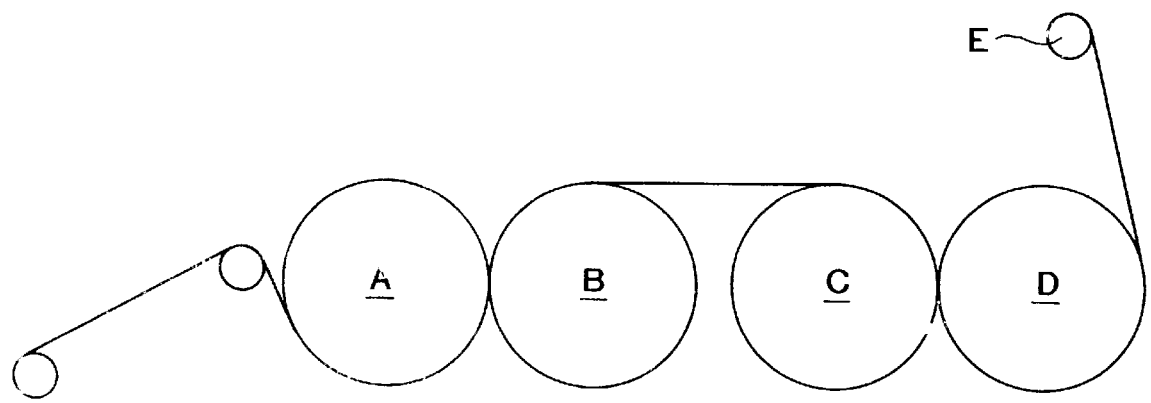
Figure 2C:
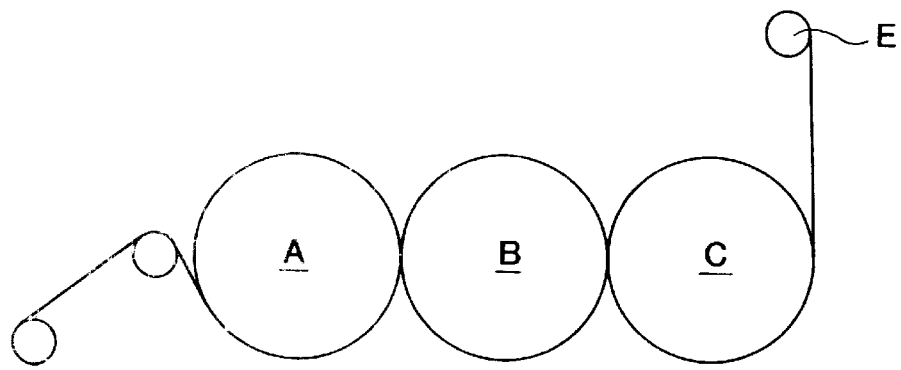

Once suitable ePTFE and elastomer precursor materials are obtained, the following processing can be performed to produce the composite material of the present invention. The ePTFE membrane can be coated by any one of a variety of methods including gravure coating to impregnate the porous structure with elastomer, as shown schematically in FIGS. 2A, 2B and 2C. The ePTFE membrane is paid out onto a gravure roll (A), whereupon it is wetted with liquid elastomer. The liquid is driven into the porous structure with the application of pressure by means of rubber roll (B) pressing against the gravure roll (A). Optionally, the impregnated membrane can be further conveyed, as shown in FIG. 2B, to either a chrome roll (C) to chrome roll (D) gap for the application of a top coat of liquid elastomer, or as shown in FIG. 2C, to a rubber roll (B) to chrome roll (C) nip. The coating thickness can be varied to produce composites of desired elastomer content. The coated structure is then either taken up in the uncured state around a cylindrical mandrel (E) to a desired wall thickness or passed through a convection oven to cure the ePTFE reinforced elastomer membrane. In the uncured state, the elastomer impregnated ePTFE can either be vulcanized around a mandrel to form a tubular article, such as pump tubing, or removed from the mandrel by cutting along the longitudinal axis to produce a flat sheet of uncured material. The uncured material can then be die cut to produce preforms for compression molding into articles of complex shape such as a diaphragm, O-ring, gasket, etc. Another approach is to take up the coated membrane onto a mandrel and slice the material into tapes of desired width. The tapes can then be wrapped around a mandrel using filament winding techniques to generate three dimensional objects of irregular shape and unlimited length.

In The ratio of elastomer to expanded PTFE should be sufficient to render the article elastomeric without adversely affecting flexure endurance. Compositions too lean in elastomer provide articles that behave in a plastic-like manner. They often exhibit considerable creep, hysteresis, and lack of resilience or rebound. Compositions that are too rich in elastomer do not benefit from the microstructure of nodes interconnected with fibrils that provide the unique flex life and strength of the instant invention. Thus, the composition most suitable for maximum fatigue life ranges from approximately 1:1 elastomer to PTFE to approximately 50:1 elastomer to PTFE by volume. More preferably the ratio ranges from 4:1 to 25:1 elastomer to PTFE by volume.

Elastomeric articles can be fabricated from these composites by any number of molding techniques including compression molding, blow molding, extruding, and laminating. The preferred addition cure elastomers can be heat cured to accelerate fabrication. Articles such as pump diaphragms, O-rings, gaskets, dosing valves, tubes and other shaped articles can be readily formed by molding multilayered preforms.

The present invention comprises a composite in which the composite has a plurality of expanded PTFE layers. The PTFE layers are impregnated with at least one elastomer and the impregnated PTFE layers are adhered together by layers of elastomer. The ratio of a thickness of an elastomer layer to a thickness of an impregnated expanded PTFE layer is 6.5:1 or less. The at least one elastomer and the layers of elastomer each independently comprise a natural or synthetic elastomer and can be at least one of a methyl silicone, a phenyl silicone, a fluorosilicone, a fluoroelastomer, a perfluoroelastomer, a perluoro polyether elastomer, or combinations thereof.

In the present composite articles, the volume ratio of elastomer to expanded PTFE is at least 80%. The expanded PTFE can include at least one filler, wherein the at least one filler can be, for example, fumed silica, precipitated silica, colloidal silica or carbon black.

In some possible embodiments the expanded PTFE layers can be plasma treated or the expanded PTFE layers can contain a silane coupling agent.

The present composite materials can be used to make gaskets, o-rings, bellows and pump diaphragms.

The present invention further comprises a composite tube in which the is tube comprises a plurality of expanded PTFE layers. The expanded PTFE layers are impregnated with at least one elastomer and the impregnated layers are adhered together by layers of elastomer. The ratio of the thickness of an elastomer layer to the thickness of an impregnated expanded PTFE layer is 6.5:1 or less. The tube can have a diameter of elongation of less than 35% of the original diameter when subjected to 125 psi internal pressure at 25° C.

The at least one elastomer and the layers of elastomer each independently can comprise a natural or synthetic elastomer or can be an organosilicone such as, for example, a methyl silicone, a phenyl silicone, a fluorosilicone, a fluoroelastomer, a perluoroelastomer, a perfluoro polyether elastomer, or combinations thereof. The volume ratio of elastomer to expanded PTFE is at least 80%. The expanded PTFE used to make the tubes may include at least one filler such as, for example, fumed silica, colloidal silica, carbon black, or combinations thereof. The expanded PTFE layers of the tube can include a plasma treatment and can also have a silane coupling agent treatment thereon. The tube made in accordance with this invention can be operated in a peristaltic pump for at least 100 hours at 200 rpm at a pressure of at least 30 psi.

In a specific embodiment of the present tube, the tube comprises at least 31 layers of expanded PTFE in which the layers are impregnated with at least one organosilicone elastomer. The impregnated layers are adhered together by layers of organosilicone elastomer in which the ratio of the thickness of an elastomer layer to the thickness of an impregnated expanded PTFE layer is 6.5:1 or less.

The present tubes are non-contaminating, steam sterilizable and can be operated in a peristaltic pump for at least 100 hours at 200 rpm at a pressure of at least 30 psi.

The present composite articles can comprise a plurality of expanded PTFE membrane layers in which the layers have a thickness of between about 0.2 mil and about 3.5 mil and the layers are impregnated with at least one elastomer. The impregnated layers are adhered together by layers of elastomer and the volume ratio of elastomer to expanded PTFE in the article is at least 3:1. The at least one elastomer and the layers of elastomer each independently can comprise a natural or synthetic elastomer or can be an organosilicone such as, for example, a methyl silicone or a phenyl silicone, a fluorosilicone, a fluoroelastomer, a perfluoroelastomer, a perfluoro polyether elastomer, or combinations thereof. The expanded PTFE of the composite article can include at least one filler, such as, for example, fumed silica, colloidal silica, carbon black, or combinations thereof, and the expanded PTFE layers can have a plasma treatment thereon and/or the expanded PTFE layers can include a silane coupling agent.

Tubes made from the composite article previously described can have a diameter elongation of less than 35% of the original diameter when subjected to 125 psi internal pressure at 25° C.

The composite articles can be used to make gaskets, O-rings, bellows and pump diaphragms.

The present invention can be better understood from the following examples and comparisons. It should be understood that the scope of this invention is not limited by these specific examples.

All patents and references cited, herein in this application, are expressly incorporated into this application by reference thereto.

EXAMPLE 1 ePTFE membrane (GORE-TEX® membrane, produced by W.L. Gore & Associates, Inc., Newark, Del.), was coated with liquid silicone (See FIG. 2A) using a gravure roll (A) and a rubber roll (B) held at a pressure of 90 psi. The membrane was 1.5 mils thick, 30" wide, and was obtained as a continuous roll. The membrane had a density of 0.44 g/cc and a mean pore size was 0.25 microns. The liquid silicone was prepared as a mixture of 725 gm of α, ω vinyldimethyl endcapped dimethyl siloxane polymer (1,000 cps), 9.6 gm of tetrakis (dimethylsiloxy) silane crosslinker, 1.3 gm of 1-ethynyl-1-cyclohexanol inhibitor, and 1.75 gm of platinum catalyst (1 weight % platinum in vinyl endcapped dimethylsilicone oil). No reinforcing agent was employed.

The membrane was coated at room temperature at a speed of 5 feet per minute and taken up onto a 3.5 inch mandrel until a wall thickness of 90 mils was obtained. No top coating of silicone was employed. Next, the uncured composite was slit down the length of the mandrel and the material and laid open as a sheet. Preforms, measuring 5" wide×5" long×0.090" thick, were die-cut from the sheet and compression molded in a flat plaque mold at 125° C. using 30,000 lbs of load to prepare 0.075" thick sheets of cured composite elastomer.

The flexure endurance of the above silicone/ePTFE composite elastomer was compared to the flexure endurance of the best available constituent materials: silicone rubber and ePTFE sheeting. Commercial silicone rubber (LIM® 6745 liquid silicone elastomer produced by General Electric Silicones, Waterford, N.Y.) and ePTFE gasket sheeting (GORE-TEX® GR Sheet®, produced by W.L. Gore & Associates, Inc., Newark, Del.) were characterized using a flexure endurance apparatus, as discussed in the ASTM D2176-69 method. The specimens, measuring 0.600" wide, 0.075" thick, and 6" long, were secured in the test apparatus, loaded with a 2 Kg mass, and flexed at a rate of 66 cycles/minute over a 180 degree arc.

Figure 3:
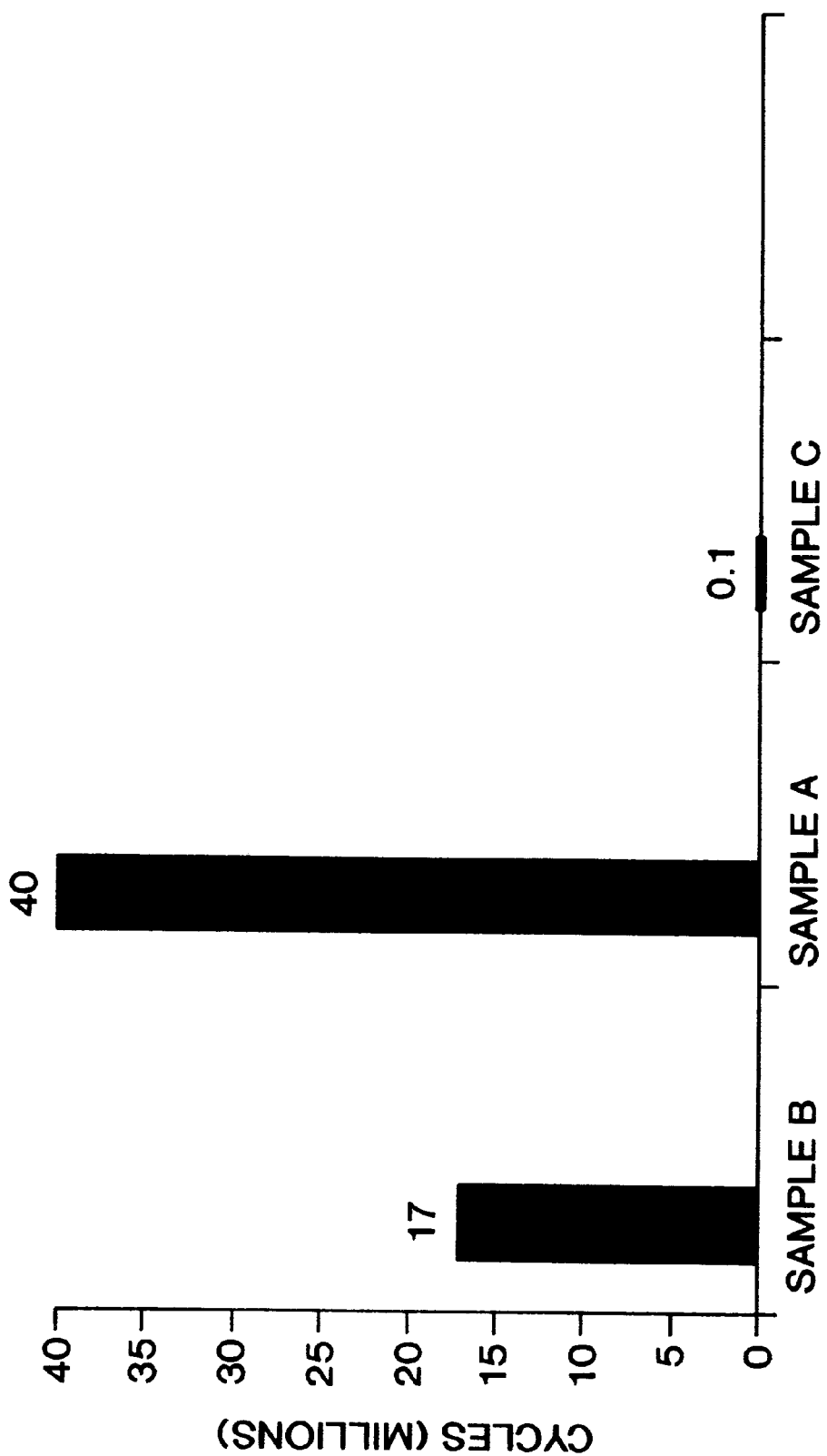
FIG. 3. Flexure endurance of silicone/ePTFE composite elastomer versus silicone rubber and ePTFE GORE-TEX® GR® sheeting using ASTM D2176-69.

FIG. 3 illustrates the dramatic difference in flexure resistance of the composite elastomer, "Sample A", when compared with the ePTFE sheeting, "Sample B", and the commercial silicone rubber, "Sample C". The composite elastomer lasted over 40 million cycles (still in test) compared to 15 million cycles for the ePTFE sheeting and 0.5 million cycles for the silicone rubber. This surprising synergistic effect of the composite being superior to the individual components appears to be related to the ability of the composite to transfer stress from one point to another on a molecular level throughout the continuous microstructure of nodes interconnected by fibrils.

EXAMPLE 2

A series of three composites were prepared in sheet form to compare their physical properties with the pure silicone elastomer precursors. First, the composite from example 1 ("Sample A") was prepared. Second, composite elastomer, "Sample D", was prepared using the method of Example 1, and utilized RTV 615 (General Electric Silicones, Waterford, N.Y.) as the liquid silicone elastomer. The third composite, "Sample E", was prepared using the method of Example 1, and utilized RTV 863 (General Electric Silicones, Waterford, N.Y.) as the liquid silicone elastomer. Table 1 summarizes the ASTM D-412 tensile strength, elongation to break, and 25 % modulus with the pure silicone "Sample F", RTV 615 ("Sample G"), and RTV 863 ("Sample H"). Also included is the ASTM D-2240 Shore A hardness and the ASTM D-624 die B tear strength values for all the materials.

For the ASTM D-412 measurement for tensile strength, dumbbell specimens were first cut from 0.075" compression molded sheets using ASTM D412 method "C". Samples were then tested in tension using an Instron tensile machine (Model 5567) operating at a strain rate of 20"/min., all at room temperature.

For the ASTM D-624 measurement for tear strength, specimens were first cut from 0.075" compression molded sheets using ASTM D-624 die ABE. Samples were then tested using an Instron tensile machine (Model 5567) operating at a strain rate of 20"/min., all at room temperature.

For the ASTM D-2240 measurement for durometer hardness, specimens from the ASTM D-412 test were stacked 3 high making a total thickness of approximately 0.225". The stacked samples were then tested and ranked using the "Type A" scale.

The composites were determined to be 4 times stronger, 40 times stiffer in tension, and were 6 times more resistant to tearing than the most highly reinforced silicone, RTV 863. These properties were obtained using a composite having a volume fraction of 80–83 % silicone.

EXAMPLE 3

A peristaltic pump tube ("Sample I") (1.125" OD and 0.75" ID) was prepared by coating ePTFE membrane (GORE-TEX® membrane, produced by W.L. Gore & Associates, Inc., Newark, Del.) using the process illustrated in FIG. 2B. The membrane was passed between the gravure roll (A) and the silicone rubber roll (B) using a pressure of 90 psi and then passed through a 3 mil gap (containing RTV 615) between the chrome roll (C) and another chrome roll (D). The membrane was 1.0 mil thick, 30" wide, and was obtained as a continuous roll. The membrane had a density of 0.44 g/cc and a mean pore size was 0.25 microns. The liquid silicone was RTV 615 (General Electric Silicones, Waterford, N.Y.) having a viscosity of 4,000 cps at 25° C. The membrane was coated at a speed of 10 feet per minute and taken up onto a 0.75" OD mandrel (E) covered with a 2 mil thick skived PTFE release liner until a wall thickness of 188 mils was obtained. The final top coat thickness of 1.5 mils was obtained to give an overall elastomer content of 90 volume %. The ratio of the thickness of an elastomer layer to the thickness of an impregnated membrane layer was 1.5. Next, the uncured composite was placed in a convection oven at 150° C. for 20 minutes and removed from the mandrel. The pump tubing was post-baked for 2 hours at 150° C. to bring about a final cure and remove volatiles. The ratio of wall thickness (0.188 inch) to inner diameter (0.75 inch) was 0.25.

Figure 4:
FIG. 4. SEM of elastomer composite having a silicone content of 90 volume %.

Sample I was cross-sectioned and viewed by scanning electron microscopy. FIG. 4 depicts a scanning electron micrograph of a cross-section taken from Sample I. The sample was cross-sectioned using a cold razor blade cutting through the composite at an angle orthogonal to the long axis of the ePTFE layers. The volume % silicone was calculated by adding the thickness of the silicone top-coat layer (a) to the thickness of silicone in the impregnated layer (b) wherein the silicone content was calculated from the ratio of ePTFE density to PTFE density which was then divided by the total thickness of the composite. In the case of Sample I, the silicone top-coat thickness was 1.5 mils, the density ratio (0.44 g/cc/2.2 g/cc) was 0.2 which yielded a silicone content of 1.2 mils in the impregnated layer, which when divided by the total thickness of 3 mils resulted in a volume % of 90.

Figure 5:
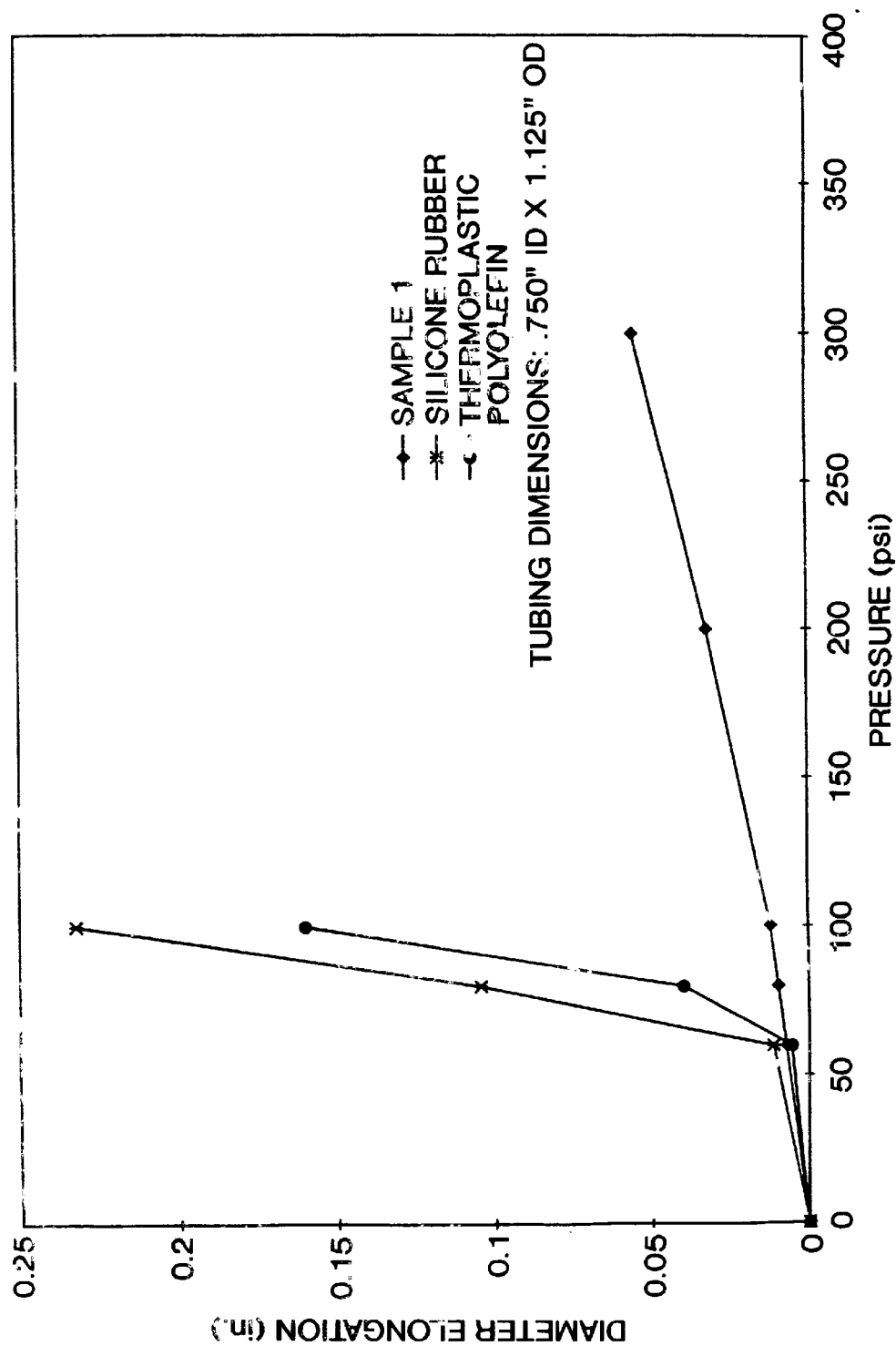
FIG. 5. Pressure handling capability of silicone/ePTFE composite elastomer compared to silicone rubber and thermoplastic elastomer, sold under the trademark MARPRENE®.

The composite elastomer tubing, "Sample I", exhibits much improved hoop strength and resistance to dilation, or diameter elongation, when subjected to internal pressure, as seen by the comparison to silicone rubber and thermoplastic elastomer in FIG. 5. Diameter elongation is defined as twice the absolute change in radius of the tube as measured by an LVTD probe placed in contact with the side of the tube. The radius was measured 60 seconds after inflation of the water-filled tube affixed to a hydraulic unit. The pressure necessary to dilate the tubes above 10% strain defines the pressure handling capacity of the tubes. Thus, the composite elastomer "Sample I", has more than 4 times the pressure handling capability of the conventional silicone pump tubing, "Sample J", and the thermoplastic elastomer (TPE), MARPRENE® tubing, shown as "Sample K".

EXAMPLE 4

Figure 6:
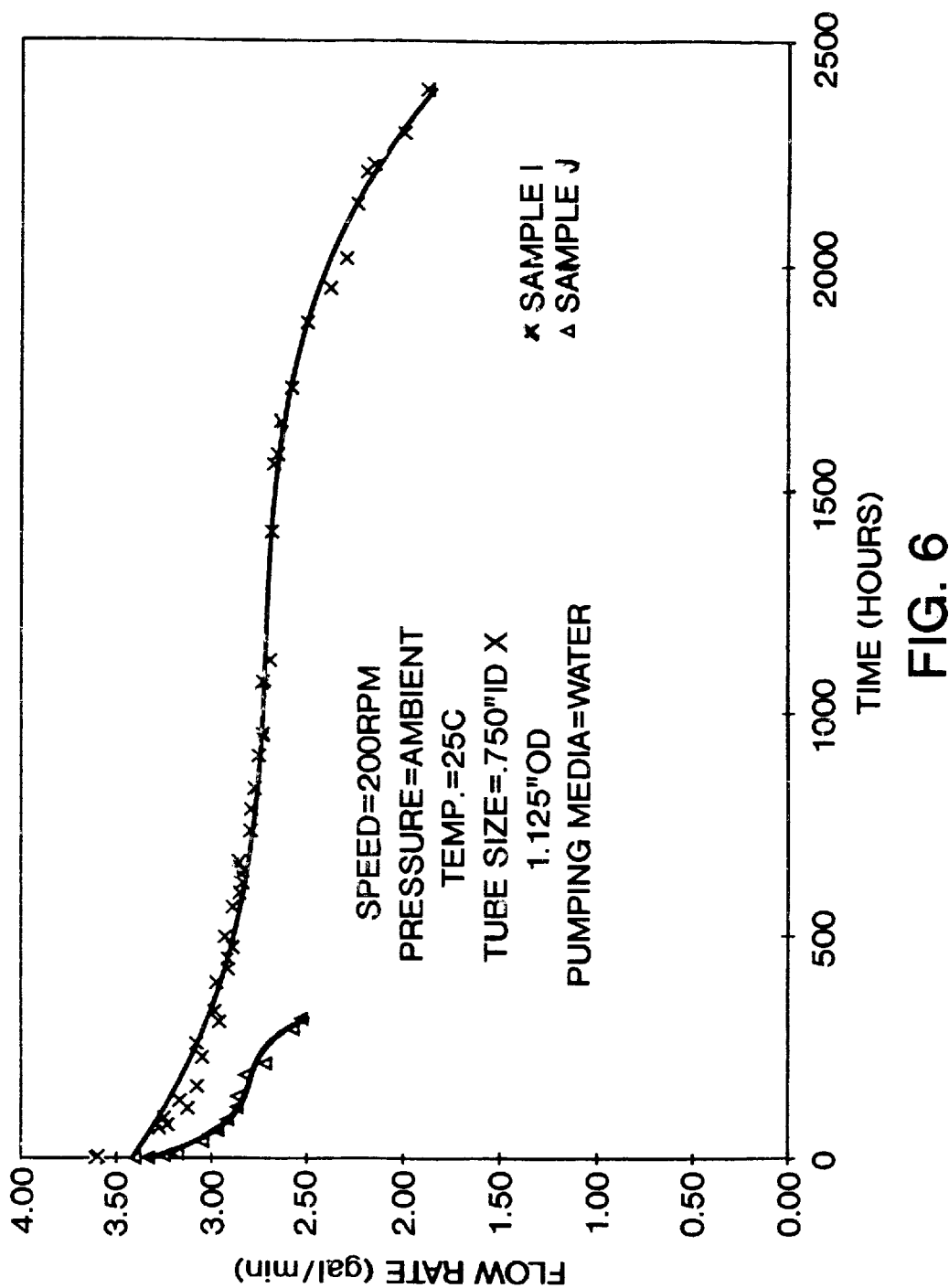
FIG. 6. Flow rate as a function of time for silicone/ePTFE composite elastomer pump tubing versus extruded silicone heat cured rubber pump tubing.

The composite elastomer tubing of example 3 ("Sample I"), was tested in a Watson-Marlow Model 704 peristaltic pump operating at a speed of 200 rpm at 25° C. using water as the liquid medium and compared with the commercial silicone tubing ("Sample J"). As depicted in FIG. 6, the silicone tubing ruptured at approximately 300 hours and the composite elastomer failed after approximately 3,400 hours. In addition to the exceptional life, the composite elastomer exhibited stable flow rate behavior throughout the duration of the test.

EXAMPLE 5

The composite elastomer tubing of example 3 ("Sample I"), was also compared to tubing prepared by the process of Safford (U.S. Pat. No. 2,710,290) wherein PTFE powder was compounded into the liquid silicone elastomer. The composite tubes were compared to the pure elastomer tubes made from RTV 615 ("Sample L") and RTV 863 ("Sample M"). Two types of PTFE powder were compounded into RTV 615A: a non-fibrillating PTFE powder (TEFLON® 6B fluoropolymer available from E.I. duPont de Nemours & Co., Inc., Wilmington, Del.) was used to prepare "Sample N" and a fibrillating powder (CD 123 available from ICI) was used to prepare "Sample O".

A composite ("Sample N"), based on non-fibrillating PTFE, was produced using the following method. A sigma blade dough mixer was first loaded with 1.6 lbs. of RTV 615A and then loaded with a total of 0.87 lbs. of TEFLON® 6 B fluoropolymer in 0.2 lb. increments to yield a 35 weight % concentrate in RTV 615A. Upon reaching high shear and complete wetting, the mixing was continued for 30 minutes at room temperature. Next, the paste was diluted to 10 weight % total PTFE solids using 7.1 lbs. of RTV 615A. The resultant mixture was well mixed, but the PTFE was not noticeably fibrillated in the RTV 615A. Finally, 400 gm of RTV 615A was mixed with 40 gm of RTV 615B using a static mixer. The mixture was pumped into a cylindrical metal mold fitted with a 0.75" diameter mandrel and cured at room temperature overnight to produce a 24" length of elastomer tubing of 1.125" OD and 0.75" ID. The tubing was removed from the mandrel and post-baked in a convection oven for 2 hours at 150° C.

A composite ("Sample O"), based on fibrillating PTFE, was produced using the following method. A sigma blade dough mixer was first loaded with 1.6 lbs. of RTV 615A and then loaded with a total of 0.87 lbs. of CD123 in 0.2 lb. increments to yield a 35 weight % concentrate in RTV 615A. Upon reaching high shear and complete wetting, the mixing was continued for 30 minutes at room temperature. Next, the paste was diluted to 10 weight % total PTFE solids using 7.1 lbs. of RTV 615A. The resultant mixture was more viscous than the prior resin due to the formation of long fibrous PTFE material in the RTV 615A. Finally, 400 gm of RTV 615A was mixed with 40 gm of RTV 615B using a static mixer. The mixture was pumped into a cylindrical metal mold fitted with a 0.75" diameter mandrel and cured at room temperature overnight to produce a 24" length of elastomer-tubing of 1.125" OD and 0.75" ID. The tubing was removed from the mandrel and post-baked in a convection oven for 2 hours at 150° C.

All three composite elastomers, Samples "I", "N", & "O", were tested using a Watson-Marlow Model 704 peristaltic pump operating at a speed of 200 rpm at 25° C. using water as the liquid medium. Table 2 summarizes the pump tubing life of the 3 compositions and compares it to the neat silicone elastomer tubing. The composite elastomer exhibited 10,000 times longer life compared to the TEFLON® 6 B fluoropolymer filled silicone and 320 times longer life compared to the ICI CD123 filled silicone. Even at identical PTFE loadings, the composite of this invention exhibited superior life as a result of the continuous microstructure of nodes interconnected by fibrils. Therefore, not only composition, but composite morphology is critical to flexure endurance.

EXAMPLE 6

The composite elastomer tubing of Example 3 ("Sample I"), was also compared to tubing prepared by the process of Tomoda (U.S. Pat. No. 4,133,927) wherein a microporous PTFE material was laminated onto a rubber substrate. In particular, an ePTFE tube (0.750" ID×0.754" OD) was prepared using the process of Gore (U.S. Pat. No. 3,953,566) and was pulled onto a 0.75" OD metal mandrel and placed into a cylindrical metal mold. The PTFE tubing had a density of 0.6 g/cc. Next, a liquid silicone (RTV 615 GE Silicones, Waterford, N.Y.) was pumped into the mold and cured overnight. The silicone wicked into the ePTFE, thus creating an integral pump tube. The tube was removed from the mandrel and post-baked in a convection oven for 2 hours at 150° C.

Both the composite elastomer ("Sample I"), and the tube made by the process of Tomoda ("Sample P"), were tested using a Watson-Marlow Model 704 peristaltic pump operating at a speed of 200 rpm at 25° C. using water as the liquid medium. The composite elastomer, "Sample I", exhibited 9 times the pump tubing life (2,400 hours vs. 267 hours) compared to the ePTFE laminated silicone elastomer, "Sample P". The laminated structures are thought to lack the molecular reinforcement provided by the ePTFE throughout the bulk of the composite. The cause of failure was delamination between the ePTFE tubing and the laminated rubber base as well as cracking throughout the bulk elastomer about the long axis of the tube.

EXAMPLE 7

A small diameter peristaltic pump tube ("Sample Q") (0.375" OD and 0.25" ID) was prepared by coating ePTFE membrane (GORE-TEX® membrane, produced by W.L. Gore & Associates, Inc., Newark, Del.) using the process illustrated in FIG. 2B. The membrane was passed between the gravure roll (A) and the silicone rubber roll (B) using a pressure of 90 psi and then passed through a 2 mil gap (containing RTV 615) between the chrome roll (C) and another chrome roll (D). The membrane was 2.0 mils thick, 30" wide, and was obtained as a continuous roll. The membrane had a density of 0.4 g/cc and a mean pore size was 0.25 microns. The liquid silicone was RTV 615 (General Electric Silicones, Waterford, N.Y.) having a viscosity of 4,000 cps at 25° C. The membrane was coated at a speed of 2 feet per minute and taken up onto a 0.25" OD mandrel (E) covered with a skived PTFE release liner until a wall thickness of 63 mils was obtained. The final top coat thickness of 1.5 mils was obtained to give an overall elastomer content of 93 volume %. The ratio of the thickness of an elastomer layer to the thickness of an impregnated membrane layer was 0.75. Next, the uncured composite was placed in a convection oven at 110° C. for 10 minutes and removed from the mandrel. The pump tubing was post-baked for 2 hours at 150° C. to bring about final cure and remove volatiles.

For comparison purposes, a silicone solvent imbibed ePTFE tube ("Sample R") was also prepared using the process of Tu (EP 256,748). First, a monolithic, porous PTFE tube was extruded on top of a solid PTFE core using the process of Gore (U.S. Pat. No. 3,953,566) to yield an ePTFE tube with initial dimensions of 0.25" ID and 0.442" OD. The mandrel aided in maintaining a constant inner diameter and enabled the material to be compressed after immersion. Next, a silicone bath was prepared using a mixture of 1 part of RTV 4010 (Dow Corning, Corp., Midland, Mich.) with 1 part of mineral spirits, by volume. The tube was then immersed in the silicone bath to fully penetrate the ePTFE structure and dried at 60° C. for 20 minutes in a forced air convection oven to remove the residual solvent. Finally, the tube was pulled through a heated, conical die (275° C.) at a rate of 3 feet per minute to compress the tubing to a 0.375" OD and fully vulcanize the elastomer. The resultant tube had a silicone content of approximately 63 volume %.

Also for comparison purposes, an extruded, heat-cured silicone rubber tube ("Sample S") was obtained from Cole-Palmer Instrument Company, Vernon Hills, Ill. The rubber tubing had an outside diameter of 0.375" and an inside diameter of 0.25".

All three peristaltic pump tubes were tested using a Cole-Palmer® Model L/S with Easy-Load® pump head (Cole-Palmer Instrument Company, Chicago, Ill.) operating at 400 rpm using water as the test medium. The elasticity of the various tubes was also quantified using a tensile testing machine operating in the compressive mode. The tubing was compressed to the point of complete closure of the inside diameter (0.25" travel), whereupon the load was removed from the sample by moving the cross-head back to the original position. This process was repeated 5 times whereupon the final stroke was recorded until the load diminished to 1% of the fully compressed load. The difference between the final stroke and the initial 0.375" gap was recorded as the amount of "set" the sample exhibited and was divided by the total diameter to yield the % rebound loss. This technique was used to quantify how elastic-like the tubes behaved. The results of % rebound loss and pump tubing life are summarized in Table 3.

The composite tube ("Sample Q") lasted 18 times longer than the commercial silicone rubber tubing. The solvent imbibed tube exhibited a plastic-like feel and had a 34 % loss in rebound upon repeated closure compared to 2.4 % loss for the composite elastomer tube. In addition, the imbibed tube appeared to sweat water droplets while operating in the pump housing. Although the tube was compressed during vulcanization, it retained some amount of porosity which led to rapid deterioration in performance.

EXAMPLE 8

A functionalized silica filled composite elastomer tube ("Sample T") (1.125" OD and 0.75" ID) was prepared by gravure coating a fumed silica filled ePTFE membrane (prepared by the process of Gore in U.S. Pat. No. 4,096,227; U.S. Pat. No. 4,187,390) using the process illustrated in FIG. 2B. The fumed silica filled membrane was prepared by co-coagulating a hydrophobic fumed silica (Degussa Corporation AEROSIL® 200 treated with 1,3-divinyltetramethyldisilazane (PCR Incorporated, Gainesville, Fla.)), with PTFE emulsion. The silica filled PTFE was paste extruded and expanded into a 2.75 mil thick membrane with 81 % pore volume. The membrane measured 30 inches wide, and was obtained as a continuous roll. The membrane had a density of 0.4 g/cc and a mean pore size of 0.25 microns. The liquid silicone was RTV 615 (General Electric Silicones, Waterford, N.Y.) having a viscosity of 4,000 cps at 25° C. The silica filled membrane was passed between the gravure roll (A) and the silicone rubber roll (B) using a pressure of 90 psi and then passed through a 4 mil gap (containing RTV 615) between the chrome roll (C) and another chrome roll (D). The membrane was coated at a speed of 2 feet per minute and taken up onto a 0.75" OD mandrel (E) covered with a 1.1 g/cc density expanded PTFE release liner until a wall thickness of 188 mils was obtained. The overall elastomer content was 91 volume %. The ratio of the thickness of an elastomer layer to the thickness of an impregnated membrane layer was 0.36. Next, the uncured composite was placed in a convection oven at 100° C. for 30 minutes and removed from the mandrel. The pump tubing was post-baked for 2 hours at 150° C. to bring about final cure and remove volatiles.

The silica filled composite elastomer ("Sample R") was tested using a Watson-Marlow Model 704 peristaltic pump operating with a back pressure of 60 psi and pumping at a speed of 200 rpm at 25° C. using water as the liquid medium and compared with the commercial silicone tubing ("Sample J"). The composite lasted for 35 hours in comparison to the commercial silicone rubber tubing which ruptured upon reaching a back pressure of 40 psi.

EXAMPLE 9

A plasma treated ePTFE membrane was used to prepare another composite elastomertube ("Sample U") (1.125" OD and 0.75" ID). The surface treated membrane was impregnated with silicone using the gravure coating process illustrated in FIG. 2B. The plasma treated membrane was prepared by passing a commercial ePTFE membrane (GORE-TEX® membrane, produced by W.L. Gore & Associates, Inc., Newark, Del.) through a microwave plasma discharge chamber (Acton Technologies, Inc., Pittston, Pa.) to functionalize the ePTFE with hydroxyl groups. Next, the hydrophilic membrane was treated with 1,3-divinyltetramethyldisilazane (PCR lncorp., Gainesville, Fla.) by immersion in the liquid at room temperature for 24 hours. The membrane was removed from the liquid and dried in an oven for 3 hours at 150° C. The treated membrane was coated using the method illustrated in FIG. 2B. The membrane was passed between the gravure roll (A) and the silicone rubber roll (B) using a pressure of 90 psi and then passed through a 1.75 mil gap (containing RTV 615) between the chrome roll (C) and another chrome roll (D). The membrane was 0.6 mils thick, 30" wide, and was obtained as a continuous roll. The membrane had a density of 0.32 g/cc and a mean pore size was 0.25 microns. The liquid silicone was SLE 5700 (General Electric Silicones, Waterford, N.Y.) having a viscosity of 50,000 cps at 25° C. The membrane was coated at a speed of 4 feet per minute and taken up onto a 0.75" OD mandrel (E) covered with a 2 mil thick skived PTFE release liner until a wall thickness of 188 mils was obtained. The overall elastomer content was determined to be 88 volume %. Next, the uncured composite was placed in a convection oven at 120° C. for 30 minutes and removed from the mandrel. The pump tubing was post-baked for 2 hours at 150° C. to bring about final cure and remove volatiles.

The composite elastomer tubing, "Sample U", was tested using a Watson-Marlow Model 704 peristaltic pump operating at a speed of 200 rpm at 25° C. with water as the liquid medium and compared with the commercial silicone tubing ("Sample J"). The composite elastomer tubing lasted longer than 1,920 hours (still testing) compared to 300 hours for the commercial silicone tubing.

EXAMPLE 10

Another peristaltic pump tube ("Sample V") (1.125" OD and 0.75" ID) was prepared by a tape wrapping process. As shown in FIG. 2B, the ePTFE membrane (GORE-TEX® membrane, produced by W.L. Gore & Associates, Inc., Newark, Del.) was passed between the gravure roll (A) and the silicone rubber roll (B) using a pressure of 90 psi and then passed through a 2.5 mil gap (containing SLE 5700) between the chrome roll (C) and another chrome roll (D). The membrane was 30" wide, and was obtained as a continuous roll. The membrane had a mean pore size of 0.25 microns. The liquid silicone was SLE 5700 (General Electric Silicones, Waterford, N.Y.) having a viscosity of 50,000 cps at 25° C. The membrane was coated at a speed of 3 feet per minute and taken up onto a 3.5" mandrel (E). The uncured composite was then slit into 15 individual tapes each 2 inches wide. One tape at a time was taken up onto a rotating 0.75" diameter mandrel using a machine lathe. The wrapping continued until the wall thickness reached 188 mils. Next, the uncured composite was placed in a convection oven at 120° C. for 30 minutes and removed from the mandrel. The pump tubing was post-baked for 2 hours at 150° C. to bring about final cure and remove volatiles.

The composite elastomer tubing, "Sample V", was tested using a Watson-Marlow Model 704 peristaltic pump operating with a back pressure of 60 psi and pumping at a speed of 200 rpm at 25° C. with water as the liquid medium and compared with the commercial silicone tubing ("Sample J").

EXAMPLE 11

Another composite elastomer peristaltic pump tube, "Sample W", was prepared using multiple liquid silicone elastomer precursors and expanded PTFE membrane. As shown in FIG. 2B, the membrane was first passed between the gravure roll (A) and the silicone rubber roll (B) using a pressure of 90 psi whereupon RTV 615 (GE Silicones, Waterford, N.Y.) was impregnated into the membrane. Next, the membrane was passed through a 10 mil gap (containing RTV 863 (GE Silicones, Waterford, N.Y.)) between the chrome roll (C) and another chrome roll (D). The membrane was 2.0 mils thick, 30" wide, and was obtained as a continuous roll. The membrane had a density of 0.4 g/cc and a mean pore size was 0.25 microns. The two liquid silicones, RTV 615 and RTV 863, had viscosities of 4,000 cps and 60,000 cps, respectively, at 25° C. The membrane was coated at a speed of 2 feet per minute and taken up onto a 0.75" OD mandrel (E) covered with a 2 mil skived PTFE release liner until a wall thickness of 188 mils was obtained. The final top coat thickness of 3 mils was obtained to give an overall elastomer content of 92 volume %. The ratio of the thickness of an elastomer layer to the thickness of an impregnated membrane layer was 1.5. Next, the uncured composite was placed in a convection oven at 120° C. for 30 minutes and removed from the mandrel. The pump tubing was post-baked for 2 hours at 150° C. to bring about final cure and remove volatiles.

The composite elastomer tubing, "Sample W", was tested using a Watson-Marlow Model 704 peristaltic pump operating with no back pressure restriction and pumping at a speed of 200 rpm at 25° C. with water as the liquid medium and compared with the commercial silicone tubing ("Sample J"). The composite elastomer tubing lasted 2,400 hours in comparison to the commercial silicone tubing which ruptured at 300 hours of operation.

EXAMPLE 12

A pump diaphragm, "Sample X", was prepared by compression molding silicone impregnated ePTFE membrane. First, an ePTFE membrane was gravure coated (See FIG. 2B) with liquid silicone (RTV 863) using a gravure roll (A) and a rubber roll (B) held at a pressure of 90 psi and then passed through a 1.5 mil gap (containing RTV 863) between the chrome roll (C) and another chrome roll (D). The membrane was 0.2 mils thick, 30" wide, and was obtained as a continuous roll. The membrane had a density of 0.3 g/cc and a mean pore size was 0.21 microns. The membrane was coated at room temperature at a speed of 4 feet per minute and taken up onto a 3.5 inch mandrel (E) until a wall thickness of 158 mils was obtained. A top coating of 1.2 mils of silicone was applied to the top of the gravure coated membrane. The ratio of the thickness of an elastomer layer to the thickness of an impregnated membrane layer was 6. Next, the uncured composite was slit down the length of the mandrel and the material and laid open as a sheet. Preforms, measuring 10 inches in diameter and 158 mils thick, were die-cut from the sheet and compression molded in an aluminum diaphragm mold at 100° C. using 80,000 lbs of load to prepare a 3 dimensional composite elastomer diaphragm.

The diaphragm was fitted to a Yamada NDP-25BT pump and operated for 240 hours with 40 psi air pressure and 10 psi back pressure to deliver 14 gal/min of water. A pump diaphragm, "Sample Y", was prepared using pure RTV 863. This elastomer was found to be too weak to be bolted into place in the pump housing for subsequent testing.

EXAMPLE 13

A composite elastomer bellows, "Sample Z", was prepared by blow molding a silicone impregnated ePTFE membrane in a closed cavity mold. First, an ePTFE membrane was gravure coated (See FIG. 2B) with liquid silicone (RTV 863) using a gravure roll (A) and a rubber roll (B) held at a pressure of 90 psi and then passed through a 1.75 mil gap (containing RTV 863) between the chrome roll (C) and another chrome roll (D). The membrane was 0.2 mils thick, 30" wide, and was obtained as a continuous roll. The membrane had a density of 0.3 g/cc and a mean pore size was 0.20 microns.

Figure 7:
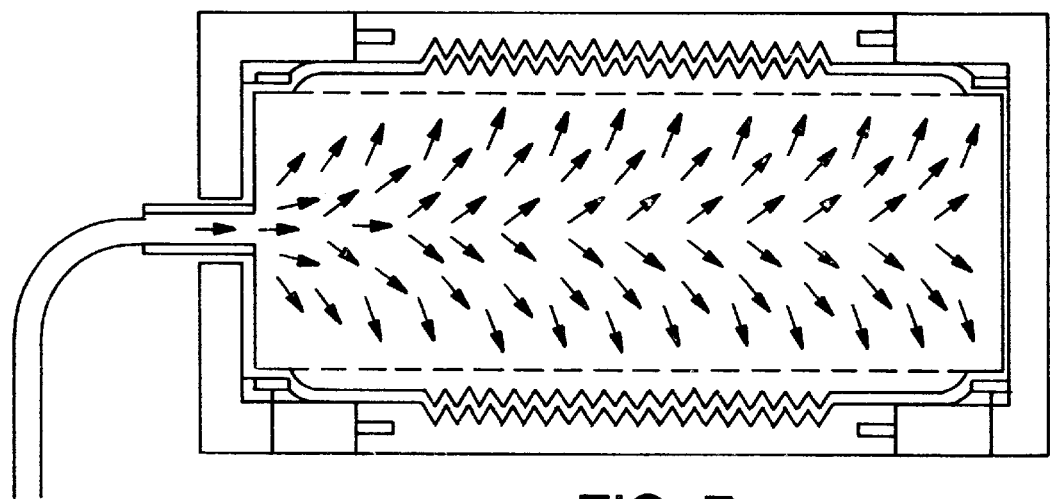
FIG. 7. Schematic representation of blow molding tool used to fabricate elastomer composite bellows.

The liquid silicone was RTV 863 (GE Silicones, Waterford, N.Y.) having a viscosity of 60,000 cps at 25° C. The membrane was coated at a speed of 2 feet per minute and taken up onto a 3.5" OD perforated metal mandrel (E) covered with an inflatable silicone rubber bladder until a wall thickness of 100 mils was obtained. The final top coat thickness of 1.3 mils was obtained to give an overall elastomer content of 97 volume %. The ratio of the thickness of an elastomer layer to the thickness of an impregnated membrane layer was 6.5. Next, the mandrel was placed in a closed cavity mold, as shown in FIG. 7, and inflated using an air pressure of 60 psi. The mold was then placed in a convection oven at 175° C. for 1 hour. The sample was then removed from the mold and post-baked for 2 hours at 175° C.

EXAMPLE 14

A solvent resistant fluoroelastomer based composite was prepared as "Sample AA". ePTFE was coated (See FIG. 2C) with 3,000 cps liquidperfluoro polyether elastomer, sold under the trademark, SIFEL® 610 (Shin Etsu Chemical Company, Tokyo, Japan) using a gravure roll (A) and a rubber roll (B) held at a pressure of 90 psi. The coated membrane was then passed between a rubber roll (B) and a chrome roll (C) held at a pressure of 90 psi. The membrane was 1.5 mils thick, 30" wide, and was obtained as a continuous roll. The membrane had a density of 0.44 g/cc and a mean pore size was 0.25 microns. The membrane was coated at room temperature at a speed of 2 feet per minute and taken up onto a 3.5 inch mandrel (E) until a wall thickness of 100 mils and an elastomer content of 85 volume % was obtained. Next, the uncured composite was slit down the length of the mandrel and the material and laid open as a sheet. Preforms, measuring 5" wide×5" long×0.100" thick and compression molded in a flat plaque mold at 125° C. using 30,000 lbs of load to prepare 0.075" thick sheets of cured composite elastomer. The sheets were post-baked in a convection oven at 150° C. for 2 hours.

Another composite elastomer, "Sample BB", was prepared by compression molding a methyl silicone impregnated ePTFE membrane. First, an ePTFE membrane was gravure coated (See FIG. 2B) with liquid silicone (RTV 863 GE Silicones, Waterford, N.Y.) using a gravure roll (A) and a rubber roll (B) held at a pressure of 90 psi and then passed through a 3.0 mil gap (containing RTV 863) between the chrome roll (C) and another chrome roll (D). The membrane was 0.75 mils thick, 30" wide, and was obtained as a continuous roll. The membrane had a density of 0.32 g/cc and a mean pore size was 0.21 microns. The membrane was coated at room temperature at a speed of 2 feet per minute and taken up onto a 3.5 inch mandrel (E) until a wall thickness of 100 mils was obtained. As the gravure coated membrane passed through the 3.0 mil gap, a top coating of 1.8 mils of silicone was applied to the membrane to yield an overall elastomer content of 96 volume %. The ratio of the thickness of an elastomer layer to the thickness of an impregnated membrane layer was 2.4. Next, the uncured composite was slit down the length of the mandrel and the material and laid open as a sheet. Preforms, measuring 5" wide×5" long×0.095" thick and compression molded in a flat plaque mold at 125° C. using 40,000 lbs of load to prepare 0.075" thick sheets of cured composite elastomer. The sheets were post-baked in a convection oven at 150° C. for 2 hours.

Table 4 summarizes the effects of various chemicals on the physical properties of the perfluoro polyether elastomer and methyl silicone composite elastomers ("Sample A" and "Sample BB", respectively). The measured properties include the ASTM 0412 tensile strength, elongation to break, 25% modulus, and Shore A hardness (ASTM D-2240). In general, the perfluoro polyether elastomer composites retain the chemical resistance of the perfluoro polyether elastomer base but draw from the ePTFE structure to dramatically increase their strength and toughness, even after extended immersion in harsh chemicals.

EXAMPLE 15

A perfluoro polyether elastomer composite pump diaphragm, "Sample CC", was prepared by compression molding silicone impregnated ePTFE membrane. First, an ePTFE membrane was gravure coated (See FIG. 2C) with liquid perfluoro polyether elastomer (SIFEL® 610) using a gravure roll (A) and a rubber roll (B) held at a pressure of 30 psi and further conveyed between a rubber roll (B) and a chrome roll (C) held at 30 psi. The membrane was 0.2 mils thick, 30" wide, and was obtained as a continuous roll. The membrane had a density of 0.3 g/cc and a mean pore size was 0.25 microns. The membrane was coated at room temperature at a speed of 5 feet per minute and taken up onto a 3.5 inch mandrel (E) until a wall thickness of 145 mils was obtained. No top coating of elastomer was employed. Next, the uncured composite was slit down the length of the mandrel and the material and laid open as a sheet. Preforms, measuring 10 inches in diameter and 145 mils thick, were die-cut from the sheet and compression molded in an aluminum diaphragm mold at 150° C. using 30,000 lbs of load to prepare a 3 dimensional composite elastomer diaphragm having an elastomer content of 83 volume percent.

EXAMPLE 16

A perfluoro polyether elastomer composite bellows, "Sample DD", was prepared by blow molding a perfluoro polyether elastomer impregnated ePTFE membrane in a closed cavity, corrugated, aluminum mold. First, an ePTFE membrane was gravure coated (See FIG. 2B) with liquid perfluoro polyether elastomer (SIFEL® X-70-701) using a gravure roll (A) and a rubber roll (B) held at a pressure of 90 psi and further conveyed between a rubber roll (C) and a chrome roll (D) held at 90 psi. The membrane was 0.2 mils thick, 30" wide, and was obtained as a continuous roll. The membrane had a density of 0.3 g/cc and a mean pore size was 0.25 microns. The membrane was coated at a speed of 4 feet per minute and taken up onto a 3.5" OD porous metal mandrel (E) covered with a silicone rubber bladder until a wall thickness of 100 mils was obtained. The overall elastomer content was 90 volume %. Next, the mandrel was placed in a closed cavity mold, as shown in FIG. 7, and inflated using an air pressure of 60 psi. The mold was then placed in a convection oven at 175° C. for 1 hour. The sample was then removed from the mold and post-baked for 2 hours at 175° C.

EXAMPLE 17

A solvent resistant peristaltic pump tube ("Sample EE") (1.125" OD and 0.75" ID) was prepared using the process illustrated in FIG. 2B. An ePTFE membrane (GORE-TEX® membrane, produced by W.L. Gore & Associates, Inc., Newark, Del.) was passed between a gravure roll (A) and a silicone rubber roll (B) using a pressure of 90 psi and then passed through a 2.5 mil gap (containing SIFEL® X-70-709)between a chrome roll (C) and another chrome roll (D). The membrane was 0.75 mils thick, 30" wide, and was obtained as a continuous roll. The membrane had a density of 0.32 g/cc and a mean pore size was 0.25 microns. The liquid perfluoro polyether elastomer was sold as SIFEL® X-70-709 (Shin Etsu Chemical Company, Tokyo, Japan) having a viscosity of 50,000 cps at 25° C. The membrane was coated at a speed of 2 feet per minute and taken up onto a 0.75" mandrel (E). The uncured composite was then compression molded in a closed cavity clam shell mold to yield a tube with a 188 mil wall thickness and elastomer content of 83 volume percent. The mold was placed in a convection oven at 120 OC for 60 minutes. The pump tubing was removed from the mold and post-baked for 2 hours at 150° C. to affect final cure and remove volatiles.

The composite elastomer tubing, "Sample EE", was tested using a Watson-Marlow Model 704 peristaltic pump operating with no back pressure and pumping at a speed of 200 rpm at 25° C. with water as the liquid medium. VITON® pump tubing is not commercially available in large diameter sizes.

EXAMPLE 18

A series of conformable films were prepared by combining various silicone and perfluoro polyether elastomers with expanded PTFE membranes as summarized in Table 5. All films were prepared, as illustrated in FIG. 2B, by passing an ePTFE membrane (GORE-TEX®membrane, produced by W.L. Gore & Associates, Inc., Newark, Del.) between a gravure roll (A) and a silicone rubber roll (B) using an applied pressure and then, optionally, passing the imbibed membrane through a gap (containing liquid elastomer) between a chrome roll (C) and another chrome roll (D). Next, the coated membranes were passed through a forced air convection oven (180° C.) to vulcanize the elastomer composites.

The membrane, liquid elastomer, and composite elastomer properties are summarized in Table 5. The composite elastomer films were also characterized with respect to their oxygen permeability using ASTM D1434-92, procedure V. Samples were loaded in a gas permeability cell (Custom Scientific Model CS-135) to provide a cross-sectional area of 66 $cm^2$. Oxygen was applied (5 psig) to one side of the mounted films at 25° C. in order to measure the oxygen permeabilities, as summarized in Table 5.

Figure 8:
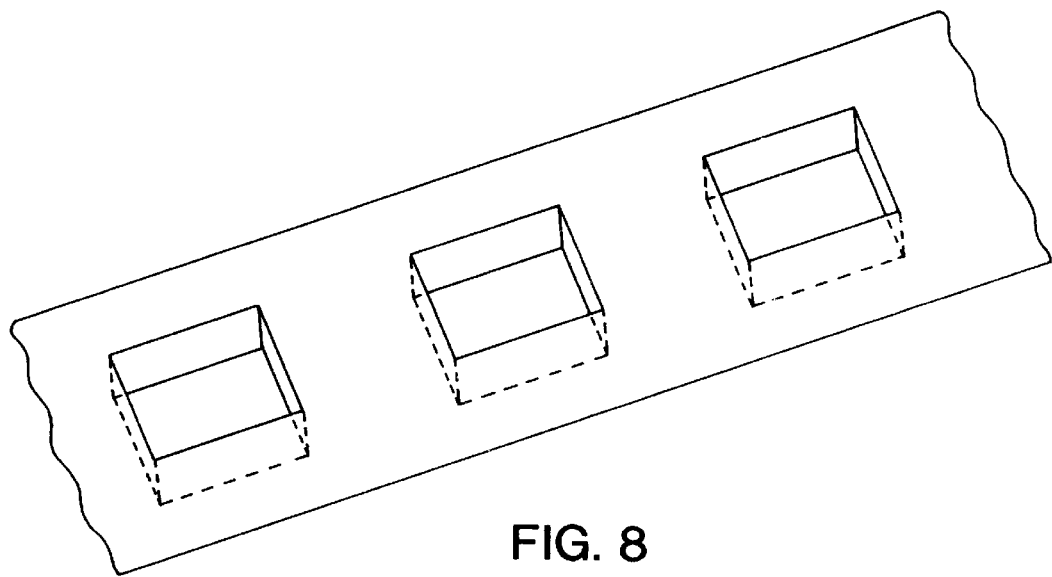
FIG. 8. Illustration of multicavity mold with composite elastomer release film used to replicate molded parts.

The composite elastomer samples were repeatedly drawn into a multiple cavity mold, as depicted in FIG. 8. Due to the toughness, tear resistance, and flexure fatigue properties of these composites, all of the samples were capable of withstanding more than 25 repeated cycles of drawing and releasing. In contrast, the commercially available release films including skived PTFE (2 mil) and ETFE (TEFZEL®) were permanently deformed after single use and developed small perforations in the films upon drawing into the mold.

EXAMPLE 19

A composite elastomer gasket, "Sample KK", was formulated and compared to a commercial silicone rubber gasket, "Sample LL", and an expanded PTFE gasket, "Sample MM" (GORE-TEX GR® sheet gasketing available from W. L. Gore & Associates, Inc., Newark, Del.). The composite elastomer, "Sample KK", was prepared by gravure coating and subsequent compression molding. An ePTFE membrane (GORE-TEX® membrane, produced by W.L. Gore & Associates Inc., Newark, Del.), was coated with liquid silicone, RTV 615 (GE Silicones, Waterford, N.Y.), by passing the membrane between a gravure roll (A) and a rubber roll (B) held at a pressure of 90 psi, as illustrated in FIG. 2C. The membrane was then passed between rubber roll (B) and chrome roll (C) at a pressure of 90 psi to improve penetration of the liquid silicone into the ePTFE structure. The membrane was 1.5 mils thick, 30" wide, and was obtained as a continuous roll. The membrane had a density of 0.44 g/cc and a mean pore size was 0.25 microns. The membrane was coated at room temperature at a speed of 5 feet per minute and taken up onto an 8 inch mandrel until a wall thickness of 156 mils was obtained. Next, the uncured composite was slit down the length of the mandrel and the material and laid open as a sheet. A preform, measuring 5.25" wide×5.25" long×0.156" thick, was die-cut from the sheet and compression molded in a flat plaque mold at 125° C. using 30,000 lbs of load to prepare a 0.125" thick sheet of cured composite elastomer. A ring shaped specimen was die cut from the sheet to yield a gasket with a 3 inch OD and a 2 inch ID.

The water sealability of the three gaskets was tested according to the ASTM F-37 method wherein the samples were secured in a 3"×0.150" ANSI ring, mounted in a hydraulic press, and challenged with 30, 60, and 100 psi of pressurized water at room temperature. Compression stress was applied to the fixture until no leaking was detected around the gasket. The stress values necessary to seal the particular gaskets were recorded and summarized in Table 6.

The elastomer composite required ½ the stress to seal compared to the ePTFE gasket and comparable stress to seal relative to the silicone rubber gasket. Thus, the composite elastomer with its low stress to seal coupled with its 6 times greater tear strength and 4 times greater tensile strength (see Table 1), provides for simultaneous conformability and toughness.

Without intending to limit the scope of the present invention, the foregoing examples illustrate how the present invention may be made and used.

While particular embodiments of the present invention have been illustrated and described herein, the present invention should not be limited to such illustrations and descriptions. It should be apparent that changes and modifications may be incorporated and embodied as part of the present invention within the scope of the following claims.

TABLE 1

| SAMPLE | SILICONE GRADE | REINFORCEMENT SOURCE | VOLUME % SILICONE | TENSILE STRENGTH (PSI) | ELONGATION (%) | MODULUS (@ 25%, PSI) | HARDNESS (SHORE A) | TEAR (PPI) |
|---|---|---|---|---|---|---|---|---|
| A | PDMS | Unreinforced | 83 | 2,700 | 195 | 1,430 | 86 | 606 |
| D | GE RTV 615 | Resin | 80 | 3,700 | 190 | 2,470 | 88 | 770 |
| E | GE RTV 863 | Fumed Silica | 80 | 3,500 | 250 | 2,500 | 85 | 850 |
| F | GE PDMS | Unreinforced | 100 | 200 | 50 | — | 40 | 0 |
| G | GE RTV 615 | Resin | 100 | 1,050 | 125 | 86 | 54 | 0 |
| H | GE RTV 863 | Fumed Silica | 100 | 900 | 320 | 62 | 48 | 137 |

TABLE 2

| SAMPLES | SILICON GRADE | PTFE GRADE | VOLUME % SILICONE | TUBING LIFE (HRS.) |
|---|---|---|---|---|
| I | GE RTV 615 | Gore ePTFE | 94.0 | 2,400 |
| N | GE RTV 615 | DuPont 6B | 94.5 | 0.25 |
| O | GE RTV 615 | ICI CD123 | 94.5 | 7.50 |
| L | GE RTV 615 | None | 100 | 7.0 |
| M | GE RTV 863 | None | 100 | 70 |

TABLE 3

| SAMPLES | SILICONE GRADE | VOLUME % SILICONE | % REBOUND LOSS | TUBING LIFE (HRS.) |
|---|---|---|---|---|
| Q | GE RTV 615 | 93 | 2.4 | 1,250 |
| R | Dow Corning RTV 4010 | 60 | 34 | 136 |
| S | Heat Cured Rubber | 100 | 2.4 | 68 |

TABLE 4

| SOLVENT | % VOLUME CHANGE | | % TENSILE CHANGE | | % ELONGATION CHANGE | | CHANGE IN HARDNESS (POINTS) | |
|---|---|---|---|---|---|---|---|---|
| | SAMPLE AA | SAMPLE BB | SAMPLE AA | SAMPLE BB | SAMPLE AA | SAMPLE BB | SAMPLE AA | SAMPLE BB |
| Hexane | 3 | 159 | −3 | 5 | −2 | −41 | −2 | −20 |
| Toluene | 3 | 114 | −3 | −2 | 0 | −55 | −2 | −17 |
| Tetrahydrofuran | 7 | 129 | −1 | 0 | −5 | −61 | −1 | −22 |
| Silicone Oil | 0 | 11 | −5 | −1 | 7 | −21 | −1 | −3 |
| Perfluoro Ether | 93 | 3 | −10 | 9 | −16 | 4 | −9 | 0 |
| ASTM Fuel C | 4 | 145 | −1 | −18 | −1 | −80 | −1 | −28 |
| Gasoline | 4 | 155 | −9 | −14 | 10 | −75 | 0 | −22 |
| Gear Oil | 0 | 6 | −5 | −8 | 0 | −32 | 1 | 0 |
| Methanol | 1 | 0 | −6 | −2 | 10 | −14 | 0 | −1 |
| Methy Ethyl Ketone | 5 | 61 | −8 | −11 | −10 | −58 | 0 | −12 |
| Acetone | 4 | 23 | −1 | −3 | −9 | −25 | −2 | 0 |
| Hydrochloric Acid | 0 | 1 | −3 | −19 | 5 | −71 | 0 | −3 |
| Sulfuric Acid | −4 | Degraded | −11 | Degraded | 31 | Degraded | −7 | Degraded |
| Nitric Acid | 2 | 0 | −1 | −29 | 1 | −63 | 1 | 0 |
| Sodium Hydroxide | 0 | 2 | 2 | −21 | −7 | −71 | 0 | 1 |

TABLE 5

| SAMPLE | VOLUME % ELASTOMER | ELASTOMER GRADE | OXYGEN PERMEABILITY ($cm^2$/sec/atm) | COMPOSITE THICKNESS (mils) | MEMBRANE THICKNESS (mils) |
|---|---|---|---|---|---|
| FF* | 80 | GE RTV 863 | $1.14 \times 10^{-4}$ | 3.0 | 1.0 |
| GG | 94 | DC Q36679 | $1.09 \times 10^{-6}$ | 2.5 | 0.75 |
| HH | 80 | GE RTV 615 | $4.61 \times 10^{-6}$ | 3.5 | 3.5 |
| II | 91 | GE RTV 615 | $3.54 \times 10^{-6}$ | 1.1 | 0.5 |
| JJ | 97 | SIFEL ® 610 | $7.49 \times 10^{-7}$ | 3.0 | 0.5 |

*Material was porous through ½ the thickness direction and resulted in leak through, and thus, above the detection limit of the cell.

TABLE 6

| SAMPLE | MATERIAL | VOLUME OF ELASTOMER | STRESS TO SEAL AT 30 PSI | STRESS TO SEAL AT 60 PSI | STRESS TO SEAL AT 100 PSI |
|---|---|---|---|---|---|
| KK | Elastomer Composite | 80 | 110 | 120 | 240 |
| LL | Silicone Rubber | 100 | 110 | 140 | 170 |
| MM | ePTFE | 0 | 200 | 300 | 450 |

We claim:

1. A composite tube comprising:
   a plurality of expanded PTFE layers having a node and fibril structure, wherein the expanded PTFE layers are impregnated with at least one elastomer,
   and layers of elastomer,
   wherein the impregnated layers are adhered together by the layers of elastomer and wherein the ratio of the thickness of an elastomer layer to the thickness of an impregnated expanded PTFE layer is 6.5:1 or less.

2. The composite tube of claim 1, wherein the tube has a diameter of elongation of less than 35% of the original diameter when subjected to 125 psi internal pressure at 25° C.

3. The tube of claim 2 wherein the ratio of wall thickness to inside diameter is less than 0.25.

4. The composite of claim 1, wherein said at least one elastomer and the layers of elastomer each independently comprise a silicone, a urethane, a nitrile rubber, a styrene-butadiene rubber, a chloroprene, a phosphazene, a fluoroelastomer, a perfluoroelastomer, a perfluoro polyether elastomer or combinations thereof.

5. The composite tube of claim 1, wherein said at least one elastomer and the layers of elastomer each independently comprise an organosilicone.

6. The composite tube of claim 1, wherein said at least one elastomer and the layers of elastomer each independently comprise a methyl silicone, a phenyl silicone, a fluorosilicone, or combinations thereof.

7. The composite tube of claim 1, wherein said at least one elastomer and the layers of elastomer each independently comprise a fluoroelastomer, a perfluoroelastomer, a perluoro polyether elastomer, or combinations thereof.

8. The composite tube of claim 1, wherein the volume ratio of elastomer to expanded PTFE is at least 4:1.

9. The composite tube of claim 1, wherein said expanded PTFE includes at least one filler.

10. The composite tube of claim 1, wherein said at least one filler is fumed silica, colloidal silica, carbon black, or combinations thereof.

11. The composite tube of claim 1, wherein said expanded PTFE layers include a plasma treatment.

12. The composite tube of claim 1, wherein said expanded PTFE layers have a silane coupling agent treatment thereon.

13. The composite tube of claim 1, wherein the tube can be continuously operated in a peristaltic pump for at least 100 hours at 200 rpm at room temperature at a pressure of at least 30 psi.

14. A composite tube comprising
   at least 31 layers of expanded PTFE having a node and fibril structure, wherein the expanded PTFE layers are impregnated with at least one organosilicone elastomer, and layers of elastomer,
      wherein said impregnated layers are adhered together by the layers of organosilicone elastomer, and wherein the ratio of the thickness of an organosilicone elastomer layer to the thickness of an impregnated expanded PTFE layer is 6.5:1 or less.

15. The composite tube of claim 14, wherein said expanded PTFE further comprises fumed silica filler.

16. The tube of claim 14, wherein the tube is non-contaminating, steam sterilizable and can be continuously operated in a peristaltic pump for at least 100 hours at 200 rpm at room temperature at a pressure of at least 30 psi.

17. A composite tube comprising:
   a plurality of expanded PTFE membrane layers having a microstructure of nodes interconnected by fibrils, the microstructure of the expanded PTFE layers impregnated with at least one elastomer, and
   layers of elastomer,
      wherein the impregnated expanded PTFE layers are adhered together by the layers of elastomer, and wherein the ratio of thickness of a layer of elastomer to the thickness of an impregnated expanded PTFE layer is 6.5:1.

18. A composite tube comprising
   at least 31 layers of expanded PTFE membrane having a microstructure of nodes interconnected by fibrils, wherein the layers are impregnated with at least one organosilicone elastomer, and
   layers of organosilicone elastomer, wherein the impregnated expanded PTFE membrane layers are adhered together by the layers of organosilicone elastomer, wherein the ratio of thickness of a layer of organosilicone elastomer to the thickness of an impregnated expanded PTFE membrane layer is 6.5:1 or less.

* * * * *